(12) United States Patent
Dömstedt et al.

(10) Patent No.: US 6,845,159 B1
(45) Date of Patent: Jan. 18, 2005

(54) PROCESSING METHOD AND APPARATUS FOR CONVERTING INFORMATION FROM A FIRST FORMAT INTO A SECOND FORMAT

(75) Inventors: Bo Dömstedt, Malmö (SE); Mats Stenfeldt, Lund (SE)

(73) Assignee: Protego Information AB, Lund (SE)

( * ) Notice: Subject to any disclaimer, the term of this patent is extended or adjusted under 35 U.S.C. 154(b) by 0 days.

(21) Appl. No.: 09/415,846

(22) Filed: Oct. 7, 1999

Related U.S. Application Data

(60) Provisional application No. 60/103,563, filed on Oct. 7, 1998.

(30) Foreign Application Priority Data

| Oct. 7, 1998 | (EP) | 98118910 |
| Oct. 7, 1998 | (SE) | 9803399 |

(51) Int. Cl.$^7$ .............................................. H04L 9/00
(52) U.S. Cl. .................. 380/44; 380/264; 380/268; 380/269; 380/28; 713/193; 713/200
(58) Field of Search .................. 380/264, 268, 380/269, 44, 28; 713/193, 200

(56) References Cited

U.S. PATENT DOCUMENTS

| 3,962,539 | A | | 6/1976 | Ehrsam et al. ............... 178/22 |
| 4,157,454 | A | | 6/1979 | Becker |
| 4,608,456 | A | | 8/1986 | Paik et al. ............... 179/1.5 S |
| 4,979,832 | A | | 12/1990 | Ritter |
| 5,214,703 | A | | 5/1993 | Massey et al. |
| 5,222,139 | A | * | 6/1993 | Takaragi et al. ............. 380/28 |
| 5,365,589 | A | | 11/1994 | Gutowitz ..................... 380/43 |
| 5,452,358 | A | * | 9/1995 | Normile et al. ............... 380/42 |
| 5,742,686 | A | | 4/1998 | Finley ........................ 380/28 |

FOREIGN PATENT DOCUMENTS

| EP | 0406457 A1 | 1/1991 | |
| EP | 0 759 669 A2 | 2/1997 | H04L/9/00 |

OTHER PUBLICATIONS

Burton S. Kaliski Jr. and Yiqun Lisa Yin, On Differential and Linear Cryptanalysis of the RC5 Encryption Algorithm, Aug. 27, 1995, pp. 171–184.

* cited by examiner

Primary Examiner—Gregory Morse
Assistant Examiner—Paul Callahan
(74) Attorney, Agent, or Firm—Darby & Darby

(57) ABSTRACT

A data processing method and apparatus are proposed for used in the encryption, decryption and authentication of messages. A memory for storing input information, a set of operations and a processor for executing the operations on the stored input information are provided. The input information is utilized to select the order and number of operations performed. The operations are devised such that any possible input string will be interpreted as a valid program and the memory is extensible. Furthermore, data is output as a function of the input information. As a result the state of the memory generated during execution is indeterminate prior to execution and the process evolves differently for each possible input string. Accordingly, the process performed by the module cannot be described by an algorithm. The method and apparatus according to the invention have a number of different applications particularly in the field of cryptography including a random number generator, a one way hash function generator or as a key generator for a cipher primitive in encryption and decryption.

48 Claims, 7 Drawing Sheets

PROCESSING METHOD AND APPARATUS FOR CONVERTING INFORMATION FROM A FIRST FORMAT INTO A SECOND FORMAT

This is a provisional Ser. No. 60/103,563 filed Oct. 7, 1998.

FIELD OF INVENTION

The present invention is directed to the conversion of information from a first format into a second format and specifically applies to a method and an apparatus for use in the encryption and decryption, the authentication of information and the generation of pseudo-random numbers.

BACKGROUND OF THE INVENTION

The encryption and decryption of information has long been an important tool for preventing unauthorized and undesired access to secret information, whether this information is stored in a computer, on a computer-readable storage medium, or transmitted between two parties over some communication link. With the evolution of computers and telecommunications technology, the quantity of information created and exchanged on a day to day basis is ever increasing, and ever more accessible. The need to prevent unwanted access to, and possible tampering with, this information in a speedy manner that ensures high security is therefore greater than ever before.

Encryption and decryption schemes typically rely on the use of an algorithm in combination with a data sequence or so-called cipher key. Conventionally, symmetric algorithms, wherein the sender and receiver (or creator and reader) of information share the same secret key, are most common. These schemes generally fall into one of two classes, namely, stream ciphers and block ciphers. An example of the latter scheme is the Data Encryption Standard (DES) described in U.S. Pat. No. 3,962,539. In such a scheme, the algorithm is time-invariant. In other words, two different plaintext messages encrypted with the same key undergo an identical series of computational steps. Depending on the algorithm, a change of key may alter the computation only slightly. Since no algorithm and key combination is truly safe (e.g., a cryptanalyst attempting to decrypt a message armed with a powerful computer is limited only by the time required to try all possible permutations) and the algorithm of known schemes is essentially invariant, the security of an existing system often relies on the frequent, often daily, change of keys.

Various schemes have been proposed to alleviate the disadvantages of prior art arrangements by increasing the complexity of any given algorithm. An example is the scheme described in U.S. Pat. No. 5,742,686 to Finley. This reference describes a device and method for dynamic encryption wherein different encryption and decryption programs are selected and executed optionally repetitively on the basis of a stored data set, which serves as the cipher key. While this prior art scheme allows the creation of custom encryption and decryption codes on a per user basis, the encryption algorithm used by each user is invariant, and the complexity of this algorithm depends directly on the strength and number of encryption and decryption codes utilized.

In U.S. Pat. No. 5,365,589 to Gutowitz, a scheme for encryption, decryption and authentication is described that utilizes dynamic systems, that is, systems comprising a set of states, and a rule for mapping each state forward in time to other states. The dynamic systems employed are cellular automata. A collection of cellular automata are used as secret keys for the system. Initially a subset of this collection is selected for encryption, and the message to be encrypted is encoded into the current states. The selected keys are applied over a predetermined number of cycles and the resulting current states constitute the ciphertext. While this scheme is based on cellular automata it may not be considered truly dynamic because the number of iterations of the rules of the current key or keys is a fixed quantity determined in advance. The complexity is dependent on the number of keys or rules applied in any current encryption, and while it is possible to apply several rules in any single encryption, this is not always practicable. Furthermore, the inclusion of some reversible dynamical systems as current keys may introduce a weakness in the system.

SUMMARY OF INVENTION

It is an object of the present invention to provide an information processing method and arrangement suitable for use in an encryption and decryption or authentication scheme, which overcomes the problems of prior art schemes.

It is a further object of the present invention to provide an information processing method and arrangement that enables the complexity, and therefore the security, of known encryption and decryption or authentication schemes to be substantially increased.

According to one aspect of the invention there is provided an arrangement for converting information from a first format into a second format, comprising a memory for storing data, means for updating the memory with input information, an instruction table comprising a set of operations adapted to modify the state of the memory, processing means adapted to select operations from the instruction table in response to at least part of the input information and to execute the selected operations on the contents of the memory, at least one of the set of operations being selectable in response to any possible configuration of at least part of the input information, and means for extracting output information from the memory.

According to another aspect of the invention there is provided a method for the conversion of information from a first format into a second format comprising: establishing a set of operations for modifying the state of a memory storing input information in a first format in the memory, selecting operations from the set in response to at least part of the input information and executing the operations on information stored in the memory, wherein the set of operations is devised such that an operation will be selected in response to any possible input information stream, and extracting information from the memory in a second format after executing at least one operation.

A characteristic of the method and apparatus according to the present invention is that the process by which the input information is encoded depends entirely on this input information. Specifically, both the sequence and the number of operations executed is defined by the information to be encoded. The input information essentially serves as a program for its own encryption. Consequently, the process cannot be described in terms of an algorithm because by definition it must differ for each different input information stream. Even with knowledge of the structure of the arrangement or the steps of the method according to the invention, the actual process executed will be indeterminate until information is actually supplied. This has the advantage that the process executed cannot be described or determined without knowledge of the input information. Furthermore since each freshly selected operation will be carried out on the accumulated results of previously input information stored in memory, even partial knowledge of the input will not facilitate reconstruction of the actual process executed because the output will be a function of all the input.

A further advantage is that inputting random information will necessarily generate a random output, since both the operations executed and the information on which the operations are performed will be random. In a further aspect of the invention the aforementioned arrangement is included in a system for the encryption and decryption of message data comprising a cipher device, the cipher device being adapted to receive message data and at least one cipher key and to generate encrypted data corresponding to an encryption of the message data, wherein the output data extracted from the data processing arrangement is the cipher key.

In a still further aspect of the invention the aforementioned method is utilized in a method for the encryption and decryption of message data including utilizing the information extracted from the memory as a cipher key and encrypting the message data with a cipher function and the cipher key to generate encrypted information.

By utilizing the arrangement and the method according to the invention as a cipher key generator for a cipher primitive, the overall strength of the cipher primitive can be substantially increased. Not only will the generation of a key be a highly complex process but, in addition, several different keys can be generated and used for the encryption and decryption of a single message. This permits the security of any known cipher system be substantially improved and has the added benefit of eliminating the need for the communicating parties to have access to a large collection of shared keys.

BRIEF DESCRIPTION OF THE DRAWINGS

Further objects and advantages of the present invention will become apparent from the following description of the preferred embodiments that is given by way of example with reference to the accompanying drawings, in which.

DETAILED DESCRIPTION OF THE DRAWINGS

Figure 1:
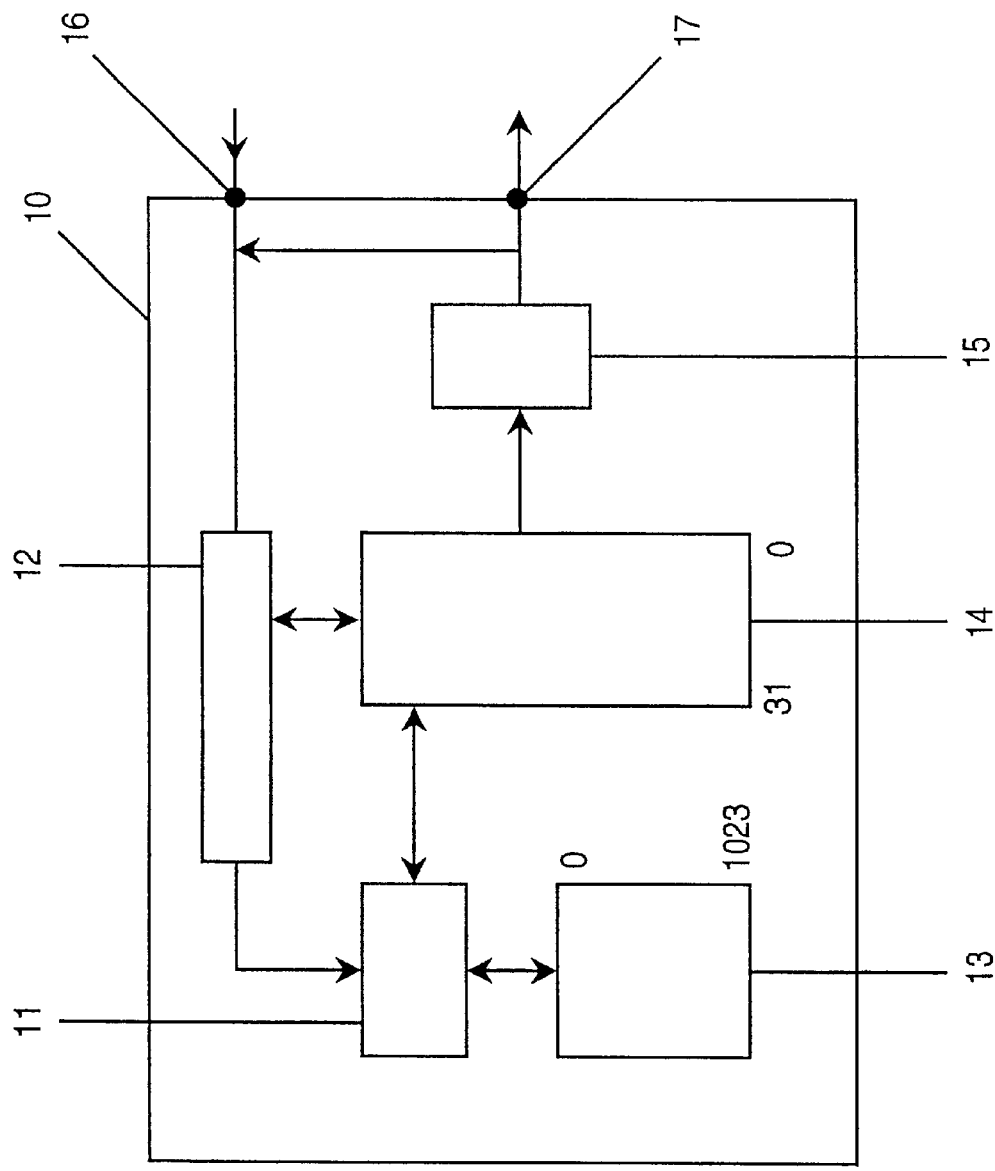
FIG. 1 is a schematic block diagram depicting a module arrangement in accordance with embodiment of the present invention.

A machine or apparatus module embodying the present invention is shown in FIG. 1 by reference numeral 10. The module 10 comprises a processor 11, a program memory 12, an instruction memory or lookup table 13, and a general purpose memory 14, which preferably should be accessible at least partially randomly. An input port 16 and output port 17 are provided for inserting and extracting information, respectively and an output register 15 is included between the general purpose memory 14 and the output port 17.

The input information, which in the preferred embodiment is in the form of a binary string, is input into the program memory 12. This memory 12 preferably has a large capacity to enable as much as possible of the input information to be accessed as program, as will be explained below. The instruction table 13 holds a predetermined set of instructions or operators (opcodes). These operators are addressed using sections of the input information stored in memory 12 as addresses or indexes to the table 13. Hence the input information essentially serves as a program according to which the processor 11 executes the operations of the instruction table 13 on data in the memory 14. The number of operators stored in the instruction table 13 is chosen to correspond to the size of the input information sections serving as program steps, so that every possible permutation of input numbers accesses a valid operator. In other words, any possible string of input numbers, in this case, any possible input binary string, is a valid program. In the exemplary embodiment, the processor 11 reads 10 bits of the stored input information at a time as a program step. This information could have any value between 0 and 1023. Hence to ensure that any possible input string will enable the processor 11 to select a valid operation, the instruction memory holds 1024 operators. The operators are preferably different and independent of one another so that no two different input strings will cause an identical sequence of operations.

Whilst in the embodiment described with reference to FIG. 1 the number system used for storing and manipulating the information is binary, which advantageously permits the use of a digital processor, it will be understood that any number system may be used according to the needs of the implementation of the module 10 and the application requirements.

An instruction pointer (IP) (shown in FIG. 2) is associated with the program memory 12 and used by the processor 11 to select the address of operators contained in the instruction table 13. The program steps constituted by the input information may be selected in a step-wise fashion from one end of the information to the other, however the processor 11 is preferably capable of controlling the pointer IP to select a program step from any portion of the information input. This in turn implies that the program memory 12 must have a capacity large enough to allow access to any section of a large amount of input information. The instruction table 12 preferably permits read and write operations to enable the order of the instructions, that is the addresses of each instruction, to be changed. The instructions themselves are chosen to change the state of the memory 14 in some way. The instructions typically include, but are not limited to, fast operations such as add, subtract, table lookup and slow operations such as integer multiply and iterations. However it is important that the instructions are limited to operate on areas of memory 14 containing data and that instructions that may arrest processing are excluded. The operations in the instruction table 13 are selected to update the memory 14 and thereby change the state of the module 10 only.

In the preferred embodiment, data is processed in units of 32 bits. Accordingly, the general purpose memory 14 holds 32-bit words, and is of a size sufficiently large to ensure adequate complexity in the generation of the output data. It should be noted that to achieve maximum complexity for any fixed number of operations, full computability should be provided. This requires that the memory be extensible, that is, it should have a size that can be altered during processing to avoid the necessity of rounding-off. It should be noted that rounding-off may cause to two different operations to produce the same result and accordingly limits the possible processing diversity of the module 10.

In FIG. 1 a bi-directional connection is schematically shown between the program memory 12 and the general purpose memory 14 to indicate that data may be exchanged between the two. Specifically, when inputting data, this information can be fed both to the program memory 12 and to the general purpose memory 14. Hence input data serves simultaneously as program and operand, and the output data will contain traces of input data that has been transformed by the program. Similarly, data from the general purpose memory 14 could be pulled into the program memory 12 and used as program. It will be understood that the initial content of the general purpose memory 14 depends on the particular application of the module 10. This will be discussed in more detail below.

The output register 15 serves to buffer blocks of output data extracted from the general purpose memory 14. The output register 15 is structured with a number of rows. In the preferred embodiment, the register 15 contains 13 such 32-bit rows. The output data is read from predetermined locations in memory. For example, if the memory were implemented as a number of stacks (see discussion below) the output data could be taken from the top of the stacks.

The extraction of output data could occur periodically, for example after the execution of a predetermined number of operators. This could be implemented using a counter and stop flag that can be updated by the processor 11. The stop flag is preferably a specific location in the general purpose memory 14. However, the extraction of output data should preferably be dependent on the input information in the same way as the processing of this information. In other words the point in time at which the stop flag will be set should be indeterminate prior to supplying the input information. Specifically, the point in time at which extraction is enabled is determined by the occurrence of a number of selected operators or the contents of a particular location in memory, or a combination of the two. This is implemented in the module 10 by providing a stop flag that can be consulted by the processor 11 at intervals, for example after every operation. The stop flag is a reserved portion of memory 14. At least one of the operators contained in the instruction table 13 updates the stop flag when it is executed.

Such an update will not normally consist of setting the stop flag to "stop" but rather to assign "stop" only if some condition is met by some data. Each individual operation that updates the stop flag, are preferably devised to do this in different ways.

Preferably several of the operations will be adapted to update the stop flag. When the stop flag is set, data is output onto the output register 15 from at least one specific location in memory. The specific location or locations may be predefined or be dependent on the operators called. In addition, specific operations may be performed on the output data prior to its transfer to the output register 15.

These additional output operations are preferably selected from a plurality of possible operations selected according to the value of a predetermined location in the general-purpose memory 14.

It will be understood that the updating of the stop flag 25 need not be limited to the description given above. However, it is important that certain conditions are imposed on the generation of the stop flag to reduce the risk of data being extracted after undergoing only very few operations.

It should further be noted that the calling of the stop flag need not arrest processing. While in a software implementation of the module 10, it is convenient to permit the processor to consult the stop flag after the execution of each operation, it will be understood that this could be done in parallel with the execution of operations. It is further evident that if the output operation were implemented entirely in hardware, the triggering of output data extraction could be independent of the functions of the processor.

The register 15 may output data in a block of equivalent size to that of the input blocks, of a larger size, or of a smaller size.

The module 10 may also include a feedback connection between the output register 15 and the general purpose memory 12 so that output is also used as program to process the contents of memory 14. This provides added security and reduces the risk that some of the data in the output register does not change from one extraction to another. Also the final output extracted by the output register 15 will then be a function of both the information input and information output. Depending on the application of the module 10, it may be advantageous to iterate this feedback operation for at least a predetermined number of times.

Optionally there can be provided a direct input connection (not shown) to the general purpose memory 14, to enable the initial state of this memory to be set externally. It will, however, be understood that the general purpose memory 14 could be at least partially filled with initializing input data via the input port 16 and the program memory 12 under control of the processor 11.

While in FIG. 1 there are schematically depicted various individual elements and connections between individual elements of the module 10, it will be understood that the implementation of the individual functional elements and the exchange of data between these elements may be achieved in different ways. In particular, a single random access memory could be provided for storing the input data-program, the operand data and possibly also the operators of the instruction set and their addresses. In order to obtain extensible memory, it is preferable to implement the memory 14 as at least one stack and possibly also at least one register, to enable data to be transferred from stack to register or vice versa. However, full computability, i.e. the capability to simulate any possible machine, will be enabled only when at least two stacks are provided. An equivalent level of computability would be provided with a bi-directional readable and writeable tape.

Full computability in a data processing device may alternatively be defined as the capability of the device given a suitable program to simulate any computational process. Such a data processing device is most often referred to as a computational machine being capable of universal computation.

Figure 2:
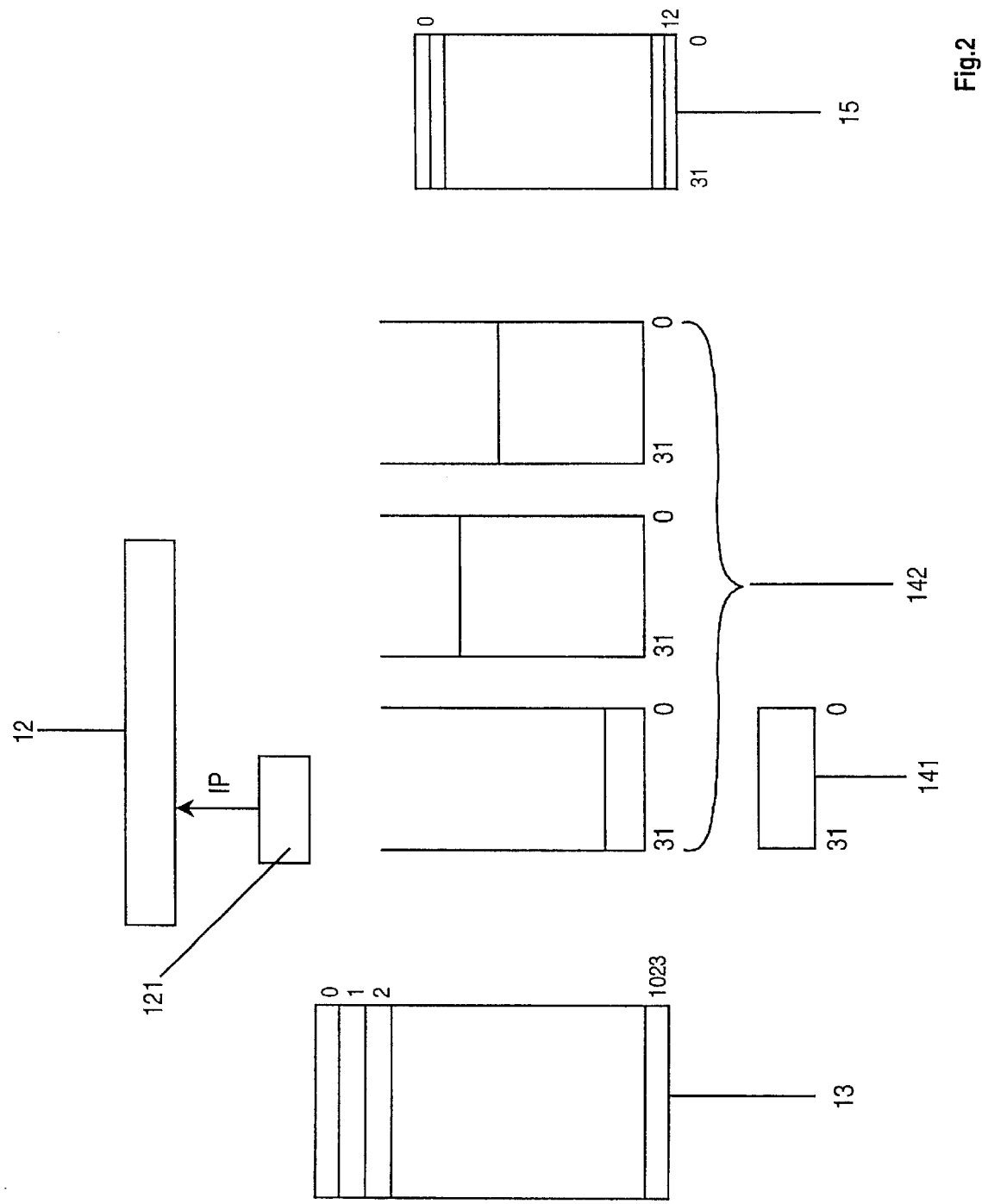
FIG. 2 is a schematic block diagram depicting the arrangement of memory in a module in accordance with another embodiment of the present invention.

FIG. 2 shows a preferred implementation of the memory elements of module 10 where in the various interconnections are omitted. In this figure, elements similar to those shown in FIG. 1 have like reference numerals. In common with FIG. 1 the arrangement according to FIG. 2 comprises a program memory 12. A program register 121, which in the preferred embodiment has a capacity for addressing a 10-bit word, is associated with the program memory 12 and serves to hold the current program step selected by the instruction pointer IP. The instruction pointer is controlled by the processor 11 (FIG. 1). As mentioned above, the size of the program memory depends on the manner in which input data is used to select operators. Ideally the program memory 12 should be large enough to store an entire input message, so that the processor may select an instruction from any part of the message. In practice this may be problematic and costly, however, to enable a reasonable simulation of full computability it is preferred that the program memory has a capacity for at least 100,000 bytes. The instruction table 13 is the same as in FIG. 1 and is adapted to hold 1024 instructions that are accessed by means of the information in the program register 121. The general purpose memory 14 of FIG. 1 is replaced by three stacks 141, each adapted to hold 32-bit words, and at least one register 142. The implementation of the memory with stacks permits the memory to grow as the processing proceeds and accordingly substantially enables full computability. The stacks 141 could be empty initially and filled progressively with input data as the input sequence is fed into the module. Alternatively, and depending on the application, the stacks 141 could be initialized with a random number sequence or any predetermined number sequence. The register 142 serves to extend the instruction set and specifically is used to temporarily store data when the stacks are updated. With the memory implemented as shown in FIG. 2, the instructions contained in the instruction table 13 can include operations to transfer data between two stacks 141, between a stack 141 and the register 142, operations on data contained in the stacks 141 and the register 142, and an operation that may alter the order of other operations. If more than one register 142 is provided, valid operations could also include transfers between registers.

In order to ensure a high complexity in the process, it is preferred that the number of available instructions is at least 15 of the order of 500 and that the memory 14 is at least 100,000 bytes in length. If the memory is implemented in the form of stacks and registers, it is preferred that registers with capacity of at least 150 bits and at least three memory stacks are available. One way of characterizing embodiments of the invention is by the requirement that the operations in the instruction table comprise such a large number of different operations that all combinations of said instructions can be simulated only by a data processing device having full computability. The least theoretical number of operations achieving this requirement is limited to a few suitably selected different operations.

The arrangement shown in FIGS. 1 and 2 represent the functional structure of the module 10 according to the present invention. It will be appreciated that this function may be implemented in a number of different ways. A hardware implementation could involve the use of a microprocessor with an associated non-volatile memory containing mapping between the selected program steps represented by the input data and the predetermined instructions, and random access memory (RAM) for storing the input program, the data used as operands and the output data. The entire module 10 could also be implemented in software. This has the advantage that the size of the program steps and the number of available operations can be changed more easily and accordingly be adapted to any specific application. A software implementation of the module would preferably be stored on a nonvolatile memory, such as the hard disc of a computer, or even on a machine-readable storage medium such as a set of diskettes, CD ROM or tape for use with any data processing machine. The program could also be made available through transmission over a telephone line, on the internet or via other communication means, by modulating a carrier signal with information representing the program.

While it may be possible to implement the functions of the data processing module 10 on any general purpose computer, this would entail the incorporation of a number of essential modifications. In particular, in the module and method according to the present invention all possible input data strings must be interpreted as valid program and be capable of addressing a valid instruction. This is necessary to prevent unauthorized instructions from terminating execution of the program and limiting the complexity, of the module's function. Most general purpose commuters also have a minimal set of operations where each operation perform an atomic operation only. The present invention could use an operation list of more complex kind, where each selected operation perform a series of state changes, as compared to a single state change for the well-known general purpose computer. Furthermore, the processor must be prevented from accessing extended virtual memory. Since any selected instruction must be valid, instructions such as JUMP and MOVE must be limited to areas of real memory if they are to be authorized. Finally, all instructions that arrest processing, such as a HALT instruction, or output data on a screen or printer must be excluded from the instructions set. In this respect it is important to note that the module 10 is not intended to output data in the conventional sense as part of its normal execution. It merely operates to update internal memory. In this respect, the output register 17 can be viewed as external to the processing of module 10 as such, since it extracts selected portions of the memory at intervals during operation without influencing the contents of the memory.

The module 10 is a data processing device wherein the state generated during execution cannot be predicted prior to execution. The process evolves differently for each possible input string. In other words, the process performed by the module cannot be described by an algorithm. This function has a number of useful applications, particularly in the field of cryptography. The operation of the module 10 for some of these applications will be discussed below.

Random number generator

As mentioned above, the sequence of operations performed by the module 10 depends on the input information. Hence inputting a random number sequence, commonly called a "seed", will be interpreted as a program of random operations and consequently generate a random output.

Random number generators have many uses. An example is the generation of weekly lottery numbers. Another application would be in the area of Monte-Carlo simulations, or as a random number generator for Genetic Algorithms or Simulated Anneling. An important further application is the generating of cipher keys for the encryption and decryption of information.

The initial input sequence should be obtained from a high quality, random, noise source, such as the SG 100 hardware noise generator manufactured by Protego Information AB, Malmo, Sweden.

Prior to operation, the general purpose memory 14 of the module 10 will be at least partially filled with a random sequence. This sequence may be the seed itself which would then be loaded simultaneously into the program memory 12 and general purpose memory 14. Alternatively a separate random number may be used. This has the advantage that a larger initial sequence could be used to define the state of the general purpose memory 14 than is needed or desired as a seed. The seed would then be input into the program memory 12. For this application, the seed could be input in its entirety, and the instruction pointer moved stepwise through the sequence, selecting the corresponding instruction as it moves. As an instruction is selected, the data contained in the general purpose memory 14 will be updated in some way defined by the operation. A number of operations contained in the instruction table 13 will also update the stop flag that is represented by a location in the memory 14. The value of the stop flag will be checked at intervals, possibly after the execution of each instruction, and when it is found to be set, data contained in specific locations in memory will be read out to the output register 15 as random output.

The module 10 should preferably be capable of generating a large number of different keys from a single seed. This may be achieved simply by repeating the program defined by the seed. Preferably, however, the program will not be limited to the steps defined in the seed but will also use other data as program. For example the contents of the general purpose memory 14 might be used. This may be implemented by automatically loading the program memory 12 from a specific location in the general purpose memory 14 once the instruction pointer IP has stepped through seed, or when the program memory is empty. As a further possibility, any data extracted as a random output could also be fed back into the program memory 12. However, to reduce the likelihood of some of the output data being unchanged between extractions, the whole process should be repeated at least once with the last generated key serving as input data before the random number output is actually produced. In this way, the amount of random output that can be generated will be limited only by the run time of the module 10.

One Way Hash Function

It will be apparent from the nature of the module 10 that its function is not reversible. In other words, the module will not generate input information from the corresponding output data. As discussed above, the output string length can be fixed while the input string length may be variable. The module 10 can thus be used as a one way hash function. Other names for this function include compression function, contraction function, message digest, fingerprint, cryptographic checksum, message integrity check (MIT) and manipulation detection code (MDC). 5 For this application a feedback connection between the output register 15 and the program memory 12 may not be necessary. In its simplest form, a one way hash function could be implemented by initially loading the general purpose memory 14 with a predetermined bit stream, for example alternate l's and O's. The message to be fingerprinted is then input into the program memory 12 and the processor executes all the operations until the message is terminated and then stop. The data contained in the output register would then be the cheeksum, or fingerprint, of the message.

In a further embodiment, the stop flag of the processor could be disabled and the processor be adapted to enable the output register 15 to extract information from one or more specific locations in the memory 14 only when the execution of the program is terminated. In this application, the size of the output register could be selected to provide a condensed fingerprint or checksum of the message.

If the verification of a message hash function is to be kept secret, a secret key can be used when computing the hash function. This is also known as Message Authentication Code (MAC) This assumes that the parties wishing to demonstrate and to verify the authenticity of a document share a secret key, or collection of secret keys, and some convention for selecting which key is to be used. In this case, the secret key could be used as the initial value of at least part of the general purpose memory 14, as a header to the message information, or employed to change the order of the operations in the instruction memory 13, i.e. their addresses, or a combination of any of these. Only a person in possession of the key used to generate the hash function can verify whether the message is authentic or not.

Encryption/Decryption

As already discussed above, the module 10 can be used as a key generator for a cipher system when fed with a random number sequence. In a preferred embodiment the module 10 is combined with a cipher primitive to generate a highly secure cipher function. The encryption and decryption arrangement is shown, in FIG. 3.

In this embodiment, the module 10 is arranged in parallel with a further element 20 representing a cipher system. The cipher system 20 may be a simple cipher primitive such as substitution, or could embody any known block or stream cipher function. However it is preferable that the cipher system 20 utilizes an algorithm with a tried and trusted level of security. If the apparatus according to the invention is to be used as a random number generator, a stream cipher could be selected, and the encrypting sequence resulting from the stream cipher could be used as a random source.

As for any encryption and decryption scheme, a secret key shared between the person encrypting the information and the person authorized to decrypt the information must be utilized.

In the preferred embodiment described below, the cipher system 20 is a block cipher function adapted to use two keys to generate ciphertext. One key is a secret key EKEY shared between the parties; the other key IKEY is generated by the module 10. In the arrangement depicted in FIG. 3, the input message or plaintext is fed simultaneously into the cipher system 20 and the module 10. The module 10 generates an internal key, IKEY, and supplies this to the cipher system 20. The secret external key EKEY that is shared by the two communicating parties, or by parties authorized to access the encrypted information, is also input into the encryption and decryption arrangement and is used by the module 10 to generate the internal key IKEY. The cipher system 20 uses this internal key IKEY and also the external key EKEY to generate ciphertext. The ciphertext is output by the cipher system 20 on the right-hand side of the figure. The output ciphertext is also fed back from the output of the cipher system 20 to the module 10, and is 30 utilized as program data to generate subsequent keys. In this way, the internal keys IKEY will be generated as functions of both the plaintext and the ciphertext.

A further feedback connection is provided between the output and the input into both the module 10 and the cipher system 20 to allow a message to be encrypted several times prior to storage or transmission.

Before being input into the module 10 and the cipher system 20, the message plaintext is preferably compressed using a compression function 21. Any known reliable compression function can be utilized. The compression serves to eliminate, or at least reduce, any periodic pattern in the message text sequence. This is advantageous particularly when several messages at least partially share the same format, such as a header having addresses, identification and checksum or the like, or carry a limited range of information, such as may occur for electronic money orders for instance. As a further precaution to ensure that no two plaintext messages will be the same, a random number is also added to the message text using a combiner 22. It will be understood that while in FIG. 3 the combiner 22 is shown as a separate element, this arrangement should be understood to indicate that the addition of random noise occurs prior to the functions performed in the module 10 and the cipher system 20. In a hardware implementation of the encryption and decryption arrangement, the combining function could be performed in either the module 10 or the cipher system 20, or even in both. As discussed above, a random number should be obtained from a high quality noise source. The combiner 22 preferably interleaves random numbers with the message text as will be described below.

Information is both read into the encryption and decryption apparatus and processed in words of 32 bits. Before information can be fed to the apparatus it is formatted into blocks. These have the generalized structure shown in FIG. 4. Since the formatting into blocks is performed prior to feeding the information into the module 10 and cipher system 20, this function is preferably performed in combiner 22.

Figure 3:
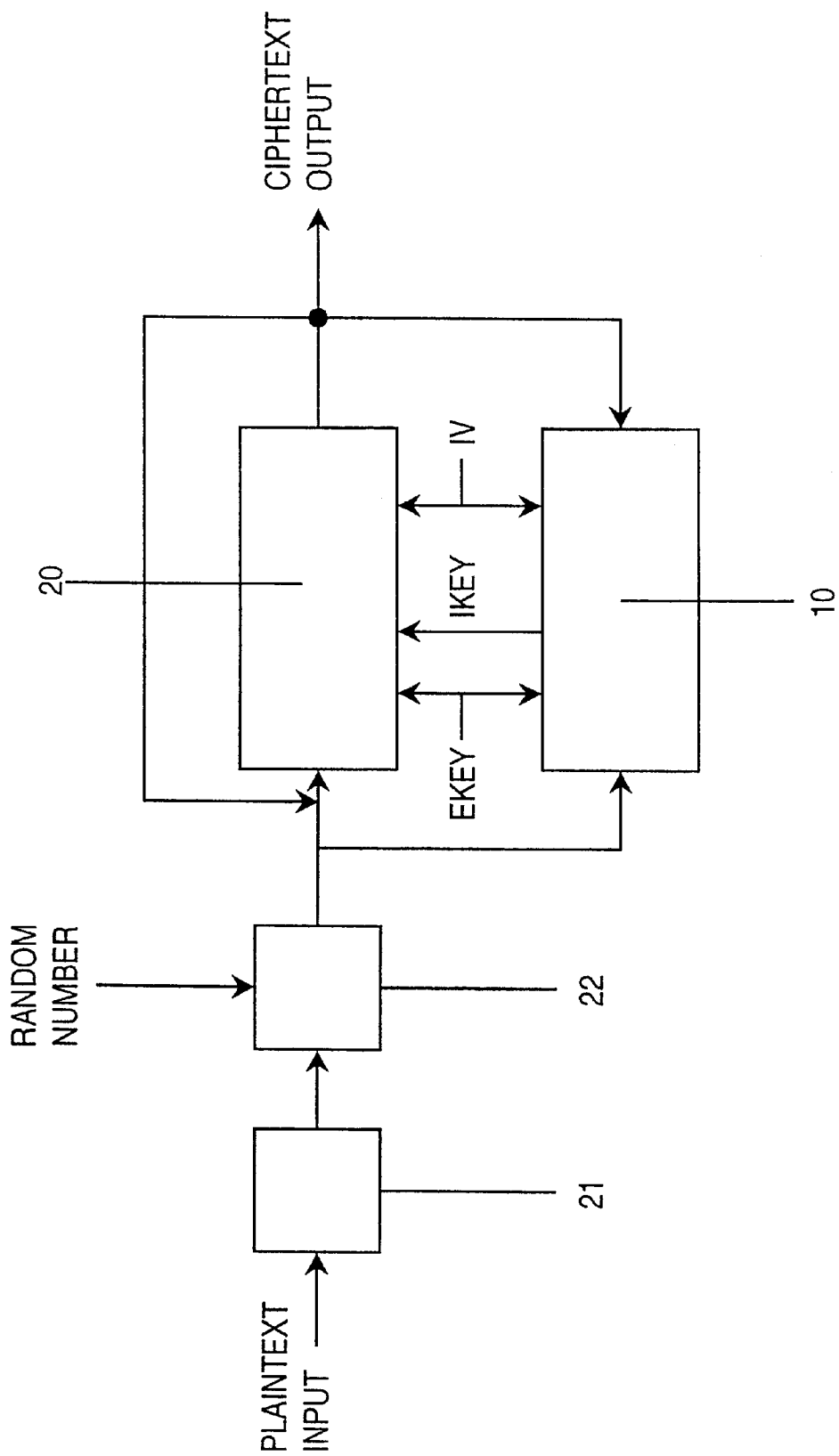
FIG. 3 is a schematic block diagram showing an application for the module of FIG. 2 in an encryption and decryption arrangement.
Figure 4:
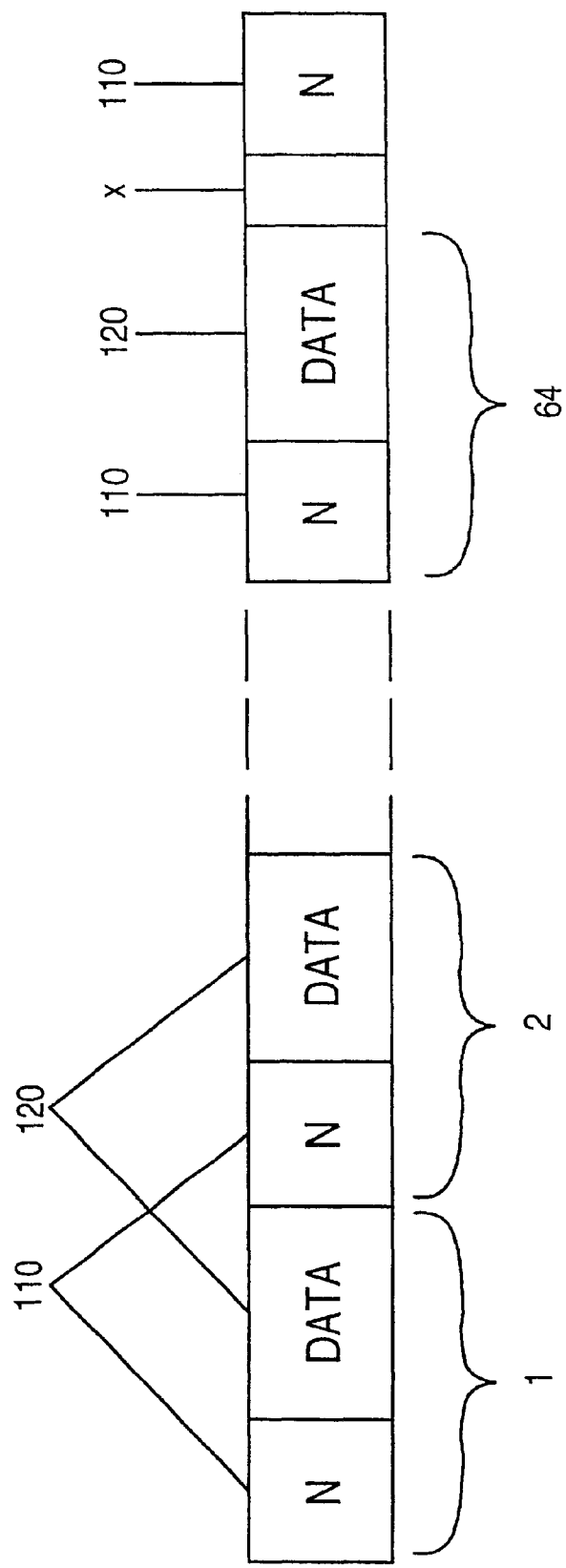
FIG. 4 schematically illustrates in block format, input for an encryption and decryption apparatus according to the present invention.

As shown in FIG. 4, the block comprises a number of plaintext portions 120 interleaved with random noise 110. Specifically, the plaintext (DATA), preferably previously compressed, is divided into portions 120 containing a maximum of 8192 bytes. If less than 8192 bytes of information are present, a smaller plaintext portion 120 is formed. The same is true if less than 8192 bytes remain after the total (compressed) plaintext is divided into portions. However, as the encryption and decryption arrangement of FIG. 3 processes information in 32 bit words, all plaintext portions 120 must be divisible by 4 bytes. This is achieved by adding a sequence of 0 to 3 bytes of random noise to any short plaintext portion 120.

A header 110 comprising 256 bytes of random noise (N) is inserted at the front of each section. The relative sizes of the data 120 and noise 110 portions have been selected to ensure that the message to be encrypted contains at least about 3% of random noise. It will be apparent to those skilled in the art that this proportion may be changed for certain applications depending on the level of security that is desired.

Further information, denoted by x, may be provided at the end of the block. This preferably includes a checksum for the block and may also comprise further random noise.

In the present embodiment, the number n of plaintext sections 120 per block is limited to 64. Accordingly a block can contain any value between a maximum of 512 K bytes (i.e. 524,288 bytes) and a minimum of 1 byte of plaintext.

Figure 5:
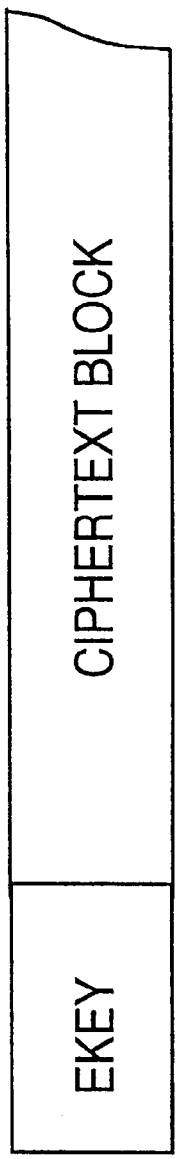
FIG. 5 schematically illustrates the format of input data accepted by the module of FIG. 1 or FIG. 2 in an encryption and decryption according to the present invention.

In the present embodiment, the external key EKEY comprises a data sequence that is a multiple of 768 bytes. The number of multiples of 768 bytes determines the number of iterations performed during encryption and decryption as will be described below. During each iteration, a new sequence of 768 bytes from the external key is fed into the apparatus as a header to the input data. The information format fed into the encryption apparatus (module 10 in FIG. 1) is shown in FIG. 5. An initialization vector (IV) comprising 772 bytes of random noise is also fed into the apparatus and is used during set-up for initializing the state of the module 10. It should be noted that whilst the external key EKEY may be the same for several different messages, the initialization vector IV will be different.

An embodiment of the inventive encryption function is described with reference to FIG. 6. In this procedure and all following procedures it is assumed that the memory of module 10 has the structure and functions depicted in FIG. 2.

The input block of the form shown in FIG. 4 is typically held in a file prior to processing. This block is presented to the cipher system 20 and the module 10 with the external key EKEY in step 501. The first time the process is executed, the memory 14 of the module 10 must be filled with certain initial values. This is performed in steps 502 to 504. Firstly, part of the external key EKEY is transferred to the stacks 142 (step 502). A number of transfer operations between the stacks to further complicate the procedure may be carried out in step 503. Finally the addresses of the instruction table 13 are at least partially randomized using the external key EKEY and the initialization vector IV which has been previously fed into the apparatus in step 501.

Figure 6:
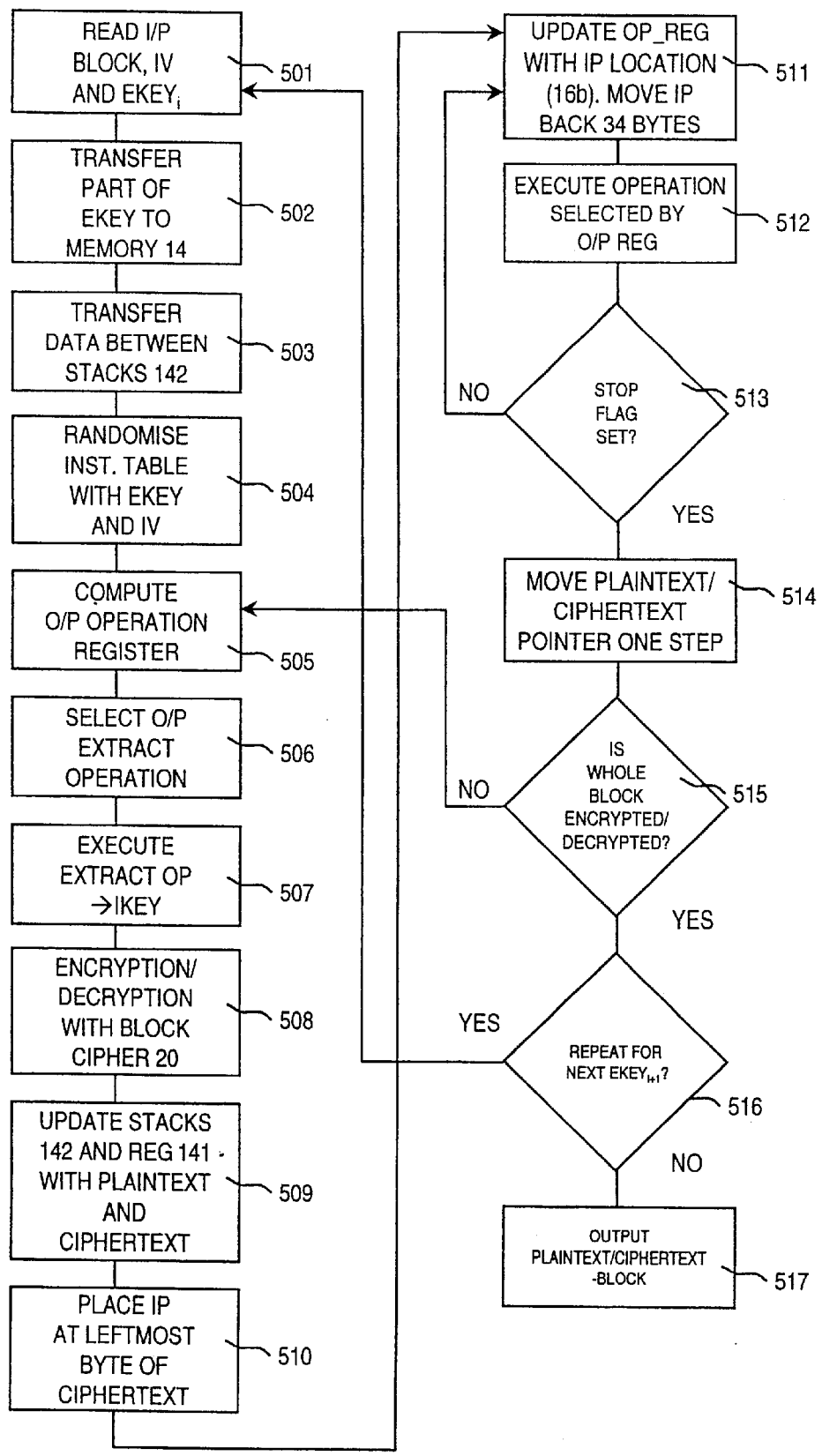
FIG. 6 is a flow diagram showing the processing steps performed by an encryption and decryption apparatus according to the present invention.

The generation of the first internal key IKEY begins in step 505 when the value of an output operation register referred to as op-reg in FIG. 6 is computed. This register actually refers to a particular memory location in the general purpose memory 14. The computation of its value may take the form of adding some information to the previous value of the location. The newly computed value is used to access or address one of a pre-defined number of output operations (step 506). The output operations variously select the values of specific memory locations in the general purpose memory 14, perform some operation on these values and update the result in the output register 15 as the internal key IKEY. In step 507 the selected output operation is executed and the internal key IKEY generated. Encryption of the firsts 32 bits of plaintext is then performed by the block cipher 20 using the internal key IKEY, and the first 32 bits of ciphertext is generated. It should be noted that this first 32-bit unit of ciphertext is generated using only information contained in the external key EKEY and the initialization vector IV; this allows an identical key to be generated for decryption when the block cipher function 20 is reversed. In step 509 the top of the stacks are updated using the 32 bits of ciphertext dnd the first 32 bits of plaintext, which in this case is the input data constituted by the compressed plaintext and random noise headers. Since the input data comprises 256 bytes of random noise before the compressed message plaintext, the first sixty-four blocks of 32 bits of input data will be comprised entirely of random noise.

In this process, the ciphertext generated by the cipher system 20 is used as program data. Prior to its input into the program memory 12, a header consisting of the 768-byte external key EKEY sequence is added to the ciphertext block and inserted as program into the memory 12. The program data used by the module thus has the general format shown in FIG. 5. In step 510 the instruction pointer IP is set pointing to the left half of the ciphertext output of step 509, and in step 511 the output operation register op-reg is updated with the 16 bits from the memory location pointed to by the instruction pointer IP. The instruction pointer IP is then moved 34 bytes back towards the beginning, i.e. backwards in time, of the input block. In step 512, the value of the output operation register op-reg is then used to select one of the 1024 operations from the instruction table 13. The op-reg actually contains 32 bits, but only 10 bits are used to call an operation. The stop flag is then checked in step 13 and if it is not set, the process returns to step 11 to update the output operation register and move the instruction pointer back a further 34 bytes towards the beginning of the input (ciphertext) block. The next operation of the instruction table 13 to be executed will then be selected based upon the contents of the operations register. This process continues until the stop flag is set. A mechanism is also provided to prevent the IP to access an location outside the input string. In one embodiment this is realized by setting the stop flag also on this condition thereby breaking the loop.

As mentioned above with reference to the module 10, a pre-defined number of operations in the instruction table 13 are adapted to update the stop flag. Once the stop flag is set, the pointers to the plaintext and ciphertext are moved one step, that is, into the next 32 bits of plaintext and ciphertext (step 514). This step corresponds to the next 32-bits of plaintext and ciphertext being loaded into the general purpose memory 14 and program memory 12, respectively. If the entire plaintext input block has not been encrypted (step 515), the process returns to step 505 to generate the next internal key IKEY for encrypting the next 32-bit ciphertext sequence. Otherwise, the process continues to step 516 for checking whether there is a new 768-byte key sequence $EKEY_{i+1}$. If so, the process continues at step 501 with the next $EKEY_{i+1}$ and otherwise, the process continues to step 517 to output the plaintext/ciphertext block.

As mentioned above, the block cipher 20 may comprise any conventional cipher primitive that uses substitution tables and various operations at least partially defined by the two keys EKEY and IKEY. Unlike the function of the module 10, which can only be performed in one direction, the block cipher function is reversible, provided the appropriate reverse mapping tables are used and the identical key provided. Accordingly, the decryption of ciphertext using the arrangement of FIG. 3 can also be performed using the procedure illustrated in FIG. 6.

It should be noted that the list of secret external keys $EKEY_1$, $EKEY_2$, etc., will be known to persons authorized to decrypt the information.

The initialization vector IV is likewise known, and may even be published. Since the actual operations performed on the memory contents are dependent on the input sequence, and this input sequence by definition will contain some unknown element, a cryptanalyst will have no way of deducing the encryption function from the initialization vector only.

In fact decipherment of an encrypted message requires that the IV vector be known prior to decipherment. The IV is normally sent "in clear" together with the cryptogram. It should be noted that, as the IV as well as the EKEY enters the invention both as program specification and also as input data, to the module 10, that all forthcoming operations and data, internal to the memory 14 as well as present in the output 17, will depend on these inputs.

If the IV is selected truly randomly prior to encrypting the plain text, no two encrypted messages will share the same IV. If each iteration, according to FIG. 6, is executed with an independent external key EKEY it is clear that the combination of an EKEY and an IV will occur only once. The IV is the same for all iterations where the EKEYs will be different and the IV will change to next message where the EKEY will be the same.

Both the external key EKEY and the initialization vector IV are identical for encryption and decryption. Hence the execution of steps 501 to 507 for each iteration with a new 768-bit EKEY sequence will give the same result. For decryption it should be assumed that the block decryption performed in step 508 will be the inverse of the encryption function and will result in the generation of 32 bits of plaintext from the first 32 bits of ciphertext. The remaining steps 510 to 513 are executed as for encryption. It should be noted that the order of the external keys EKEY used will be reversed for decryption.

Figure 7:
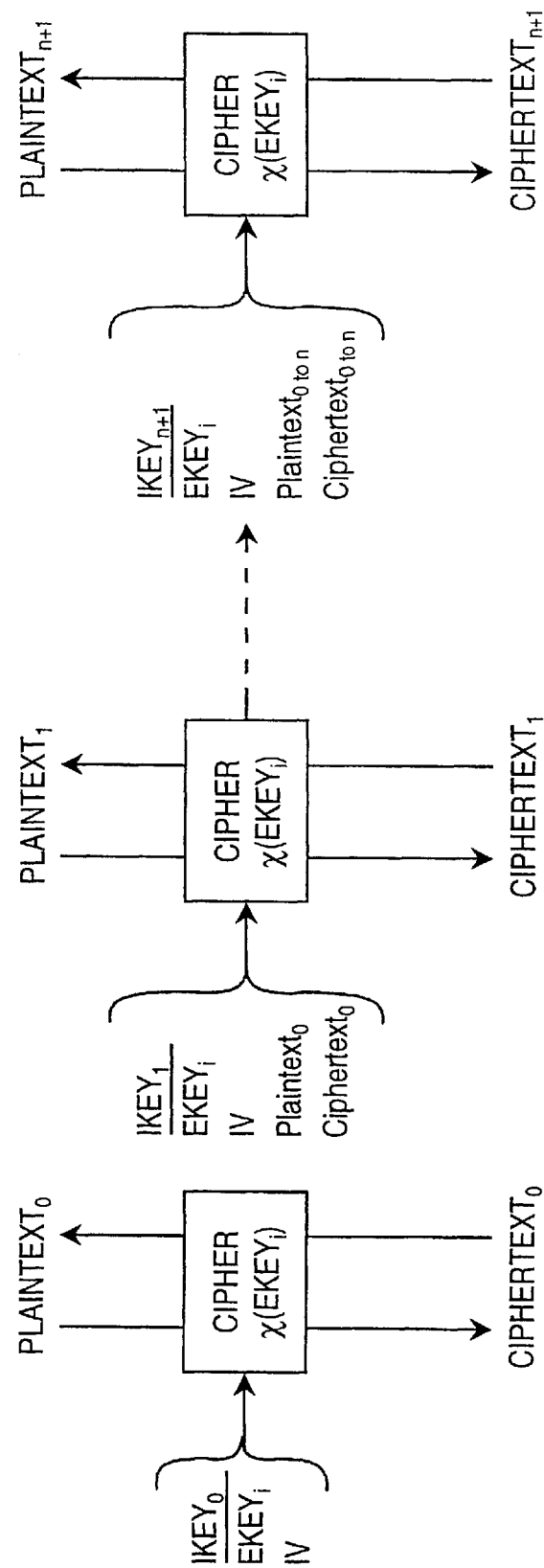
FIG. 7 schematically illustrates an encryption and decryption process using the arrangement of FIG. 3.

A schematic of the encryption and decryption for a single iteration using a cipher function and a key IKEY generated by the module 10 is given in FIG. 7. Here it is apparent that a first internal key $IKEY_0$ used to generate the first 32-bit unit of ciphertext from the first 32-bit unit of plaintext is a function of the external key EKEY and the initialization vector IV. The module 10 uses this first unit of ciphertext and the first unit of plaintext in addition to the external key EKEY and the initialization vector IV to generate the second key IKEY, which is used in the cipher system 20 to generate a second unit of ciphertext from the second unit of plaintext. This process continues until all the plaintext has been processed. The final key $IKEY_{n+1}$ used to encrypt or decrypt the final units of plaintext and cipher text will be a function of all the previous (0 to n) units of plaintext and ciphertext It is apparent from the schematic of FIG. 7 that the complexity of encryption increases for each unit, because the information content of the internal key IKEY becomes a function of all previously input plaintext and generated ciphertext. However, while the encryption of the first unit may be relatively weak owing to the relative simplicity of the key IKEY, this can be mitigated by iterating the encryption of the whole message using several different keys EKEY.

Furthermore, by reversing the order of the units for each iteration, the nominal strength of encryption of each unit will be equivalent, as each unit of ciphertext will be generated using keys IKEY that in total comprise information from the whole plaintext/ciphertext block. This implies that in FIG. 6, box 514, the pointers of ciphertext/plaintext blocks could move in either direction. In 511 the move of the IP pointer will always be backwards.

Once the full input information has been recovered, the correct decryption can be checked using the checksum tagged on the end of the input block. The 256 bytes of random noise header is then separated from the message information and the message information decompressed if it had been initially compressed.

Since the pointer to the plaintext/ciphertext block is incremented or decremented in the plaintext or cipher text in units of 32 bits, the first 64 operations on plaintext will actually be performed on the random noise N header (see FIG. 4). This ensures that the initial contents of the general purpose memory 14 comprising the stacks 142 and registers 141 will be filled with random information before the first 32-bit word of plaintext/ciphertext is loaded into program memory 12.

Due to the observed structure of most input strings the present embodiment of the invention actually process the input plaintext block (FIG. 4) in the right-to-left direction during the first iteration of the process according to FIG. 6., as this would be a security advantage for these inputs, and be of no significance to all other possible input strings.

Whilst random noise is simply placed at the head of each data sequence as shown in FIG. 4, in a further embodiment of the invention this random noise is utilized to randomize the plaintext using a system based on iterating the states of cellular automata.

In a further embodiment of the invention, the block cipher 20 incorporates substitution tables which are initialized using the initialization vector IV and external key EKEY. In a still further embodiment of the invention the above mentioned substitution tables are continuously updated to make the mapping from the input to the output varying. This is accomplished by swapping the addressed line of the decryption (incl. encryption) substitution table with another line addressed by a special field of the IKEY data. Since the mapping defined by a substitution table used in encryption must be inverted for decryption, any amendment of this mapping at set-up must be followed by the inversion of the table. In the preferred embodiment, a substitution table for decryption is generated during set-up, and then has io be inverted to obtain the substitution table for encryption. Upon decryption of the ciphertext, only the decryption substitution table need be created. This means that processing cost is reduced in decryption compared to encryption.

It is preferred that in addition to at least one substitution table, the block cipher 20 includes a plurality of parallel operations, wherein the operations executed for any particular block is determined by the internal key IKEY generated by the module 10. This maybe viewed as an arrangement of parallel paths, each path being associated with a specific operation. The internal key IKEY acts as a router, sending the plaintext or partially encrypted block down one of the paths. The operations may include, but are not limited to, mapping functions, the rotation of the block and addition operations. One path may include no operation at all. This allows the function to be performed rapidly without compromising security, since the probability that a block undergoes a specific operation depends on the number of possible paths.

It will be understood that the dimensions used for the various elements of data, for example the external key EKEY, the initialization vector IV, and the units in which the plaintext and ciphertext are manipulated in the module 10 and the cipher system 20 are given by way of example only. It will be apparent to those skilled in the art that these values may be modified to increase the security of the cipher function or reduce the processing time for any specific operation. Furthermore, modifications may be made to the content of the module 10 for the same-purpose.

As for the size of the external (secret) input key EKEY note that, at least in the present exemplifying embodiment of the invention, the key could be viewed as a compressed input software module, possibly written in the module-13-language. Its recommended size should therefore preferably be in the order of several hundred bytes. This argument applies to the other inputs as well, such as the size of the input plaintext block and the size of the random Initialization Vector IV. Note that this is implicitly included in the preferred structure of the input (FIG. 4). This will be an issue mostly when using the invention in security related environments, and it should be noted that in random number applications (by example only) of the present invention, this note may be of no relevance.

Also implicitly included in the present embodiment of the invention is that the internal information paths are intentionally of different sizes in different places. Referring to FIG. 3 the flow of information IKEY from module 10 to module 20 is much higher than the flow of information through module 20. Each 32 bits of plaintext, to be encrypted by module 20, corresponds to one instance of IKEY, which, in the preferred embodiment, has the size 8 times 32 bits (or 13 times 32 bits from module 14 to module 15 in FIG. 1):

This implies that each 32 bits of output from module 20 could, depending on IKEY, correspond to any 32 bit input plaintext, and that for each 32 bit output, from module 20, or possible each combination of 32 bit input and 32 bit output from module 20, could correspond to a large subset of all possible internal keys IKEY.

The man skilled in the field of the present invention will clearly see the benefit of this construction, but note that in other application areas of the present invention, such as random number generation, this may not be necessary to achieve.

An important characteristic of the arrangement and method according to the present invention is that providing an increased number of operations in the instruction table 13 will substantially improve the security of a system, or the quality of generated random numbers, by increasing the possible operations that may be performed. However, although such a modification will involve a higher initial hardware or software outlay, the delay in encryption or decryption will not be increased, if it is assumed that all instructions can be executed in approximately the same length of time. Accordingly, the security of a system may be increasing without an associated time penalty.

What is claimed is:

1. An information processing arrangement for converting message information from a first format into a second format, comprising:

a memory for storing data;

means for updating said memory with input information;

an instruction table comprising a set of operations adapted to modify the state of said memory;

processing means adapted to select operations from said instruction table in response to at least part of said input information, and to execute said selected operations on the contents of said memory, at least one of said set of operations being selectable in response to any possible configuration of at least part of said input information; and means for extracting output information from said memory characterized by that the operations in said instruction table are devised to cause said processing means to be capable of universal computation.

2. An arrangement as claimed in claim 1, wherein said processing means are adapted to respond to predetermined sized portions of said input information, said instruction table comprising a number of operations that is at least equal to the total number of permutations of one of said portions.

3. An arrangement as claimed in claim 1, wherein said memory is extensible.

4. An arrangement as claimed in claim 1, wherein said memory is a random access memory.

5. An arrangement as claimed in claim 1, wherein said extraction means are adapted to extract output data in response the value of a stop flag, wherein at least one operation in said instruction table is conFigureured to update the value of said stop flag.

6. An arrangement as claimed in claim 1, wherein said memory is configured to comprise at least one stack.

7. An arrangement as claimed in claim 1, wherein said memory comprises at least one register.

8. An arrangement as claimed in claim 1, wherein the operations in said instruction table are devised to cause said processing means to update portions of said memory containing input information or a result of operations on said input information only.

9. A system for the encryption and decryption of message data comprising a data processing arrangement as claimed in claim 1 and a cipher device, said cipher device being adapted to receive message data and at least one cipher key (IKEY) and generate encrypted data corresponding to an encryption of said message data, wherein an output of said data processing arrangement is connected to said cipher device to output data extracted from said data processing arrangement as said cipher key (IKEY).

10. A system as claimed in claim 9, including noise generating means for incorporating random noise with said message data.

11. A system as claimed in claim 9, including data compression means for compressing said message data.

12. A system as claimed in claim 9, comprising means for inputting said message data as input information into said data processing arrangement; and means for updating said memory on the basis of said message data.

13. A system as claimed in claim 12, wherein said processing means are adapted to select operations from said instruction table in response to at least part of said message data.

14. A system as claimed in claim 9, comprising:
means for inputting said encrypted data into said data processing arrangement; and
means for updating said memory on the basis of said encrypted data.

15. A system as claimed in claim 14, wherein said processing means are adapted to select operations from said instruction table in response to at least part of said encrypted data.

16. A system as claimed in claim 9, wherein said cipher device is adapted to perform a block cipher function.

17. A system as claimed in claim 9, wherein said cipher device is adapted to perform a stream cipher function.

18. A system as claimed in claim 9, including means for inputting a second cipher key (EKEY), and means for updating said memory on the basis of said second cipher key (EKEY).

19. A system as claimed in claim 18, including means for combining said second cipher key with said input information.

20. A system as claimed in claim 19, including means for conFigureuring said cipher device on the basis of said second cipher key (EKEY).

21. A system as claimed in claim 9, including means for inputting a random noise sequence (IV), and means for updating said memory on the basis of said random noise sequence.

22. A method for the conversion of information from a first format into a second format comprising:
establishing a set of operations for modifying the state of memory;
storing input information in a first format in said memory;
selecting operations from said set in response to at least part of said input information and executing said operations on information stored in said memory, wherein said set of operations is devised such that an operation can be selected in response to any possible input information stream; and
extracting information from said memory in a second format after executing at least one operation characterized by that the operations in said instruction table are devised to cause said processing means to be capable of universal computation.

23. A method as claimed in claim 22 including selecting operations on the basis of portion of said input information, said portion having a number of possible values that is no greater than the number of established operations.

24. A method as claimed in claim 22, including defining a value of an entity to indicate when information can be extracted, at least one of said operations being adapted to update the value of said entity on execution.

25. A method as claimed in claim 22, wherein said operations include substitution, addition, subtraction and rotation operations, and an operation devised to alter the order of the other operations.

26. A method for the encryption and decryption of message data comprising the method as claimed in claim 22, including utilizing said information extracted from said memory as a cipher key and encrypting said message data with a cipher function and said cipher key to generate encrypted information.

27. A method as claimed in claim 26, including utilizing said message data as at least part of said input information.

28. A method as claimed in claim 26, including incorporating random noise with said message data prior to encryption.

29. A method as claimed in claim 26, including compressing said message data prior to encryption.

30. A method as claimed in claim 26, including utilizing said encrypted information as at least part of said input information.

31. A method as claimed in claim 26, including utilizing a second cipher key (EKEY) to modify the contents of at least one of said instruction set and said memory.

32. A method as claimed in claim 26, including utilizing a second cipher key (EKEY) as input information.

33. A method as claimed in claim 32, including iterating the encryption of message data a predetermined number of times.

34. A method as claimed in claim 33, wherein a different second cipher key (EKEY) is utilized for each iteration.

35. A method as claimed in claim 33, wherein the number of iterations is determined by said second cipher key (EKEY).

36. A method as claimed in claim 26 including utilizing a random noise sequence (IV) to modify the contents of at least one of said instruction set and/or said memory.

37. A method as claimed in claim 26, wherein said cipher function is a block cipher function.

38. A method as claimed in claim 37, including utilizing said second cipher key (EKEY) to initialize said block function.

39. A method as claimed in claim 26, wherein said cipher function is a stream cipher function.

40. An arrangement for the encryption and decryption of information, comprising a cipher system, and message data inputting means communicating with said cipher system, said cipher system being adapted to output cipher text in response to said message data and a cipher key, wherein means for generating said cipher key are adapted to receive said message data, generate a cipher key as a function of said message data and output said cipher key to said cipher system characterized by that the means for generating said cipher key is devised to be capable of universal computation.

41. An arrangement as claimed in claim 40, wherein said cipher generating means communicates with the output of said cipher system to receive said cipher text and is adapted to generate said cipher key as a function of said cipher text.

42. An arrangement as claimed in claim 40, wherein said message data inputting means comprise random noise generating means connected to the input of said cipher system for combining noise data with said message data.

43. An arrangement as claimed in claim 40, characterized in that said cipher system is adapted to receive a second cipher key and to generate said cipher text as a function of said second cipher key.

44. An arrangement as claimed in claim 43, wherein said key generating means is adapted to receive said second cipher key and to generate said cipher key as a function of said second cipher key.

45. An arrangement as claimed in claim 40, wherein data compression means are associated with said message data input means for compressing said message data prior to its combination with said random noise data.

46. An arrangement as claimed in claim 40, characterized in that said key generating means comprise:
memory means;
means for inputting said message data into said memory means;

an instruction lookup table containing a set of predetermined operations;

processing means adapted to select operations from said lookup table in response to the content of said memory means and to execute said operations on the contents of said memory means in accordance with said instructions, wherein said processing means are adapted to select a valid operation for all possible data contained in said memory means; and means for extracting data from said memory means.

47. A machine readable electronic data recording device for use in a digital data processing machine, said data recording means being encoded with data representing a method for encrypting and decrypting information as claimed in claim 22.

48. A carrier signal modulated by signals representing a computer program adapted to of a digital data processing machine to perform a method as claimed in claim 22.

* * * * *